(No Model.)

S. M. VAUCLAIN.
COUNTERBALANCED FORGED WHEEL.

No. 420,842. Patented Feb. 4, 1890.

Witnesses:
Murray C. Boyer
William D. Conner

Inventor:
Samuel M. Vauclain
by his Attorneys
Howson & Howson

UNITED STATES PATENT OFFICE.

SAMUEL M. VAUCLAIN, OF PHILADELPHIA, PENNSYLVANIA.

COUNTERBALANCED FORGED WHEEL.

SPECIFICATION forming part of Letters Patent No. 420,842, dated February 4, 1890.

Application filed August 19, 1889. Serial No. 321,220. (No model.)

*To all whom it may concern:*

Be it known that I, SAMUEL M. VAUCLAIN, a citizen of the United States, and a resident of Philadelphia, Pennsylvania, have invented certain Improvements in Counterbalanced Forged Wheels, of which the following is a specification.

The object of my invention is to form a hollow counter-balance in a solid forged wrought-iron driving-wheel or center, which can be filled with lead or similar material until the wheel is in perfect balance when applied to a locomotive or other engine. This object I attain in the following manner, reference being had to the accompanying drawings, in which—

Figure 1:
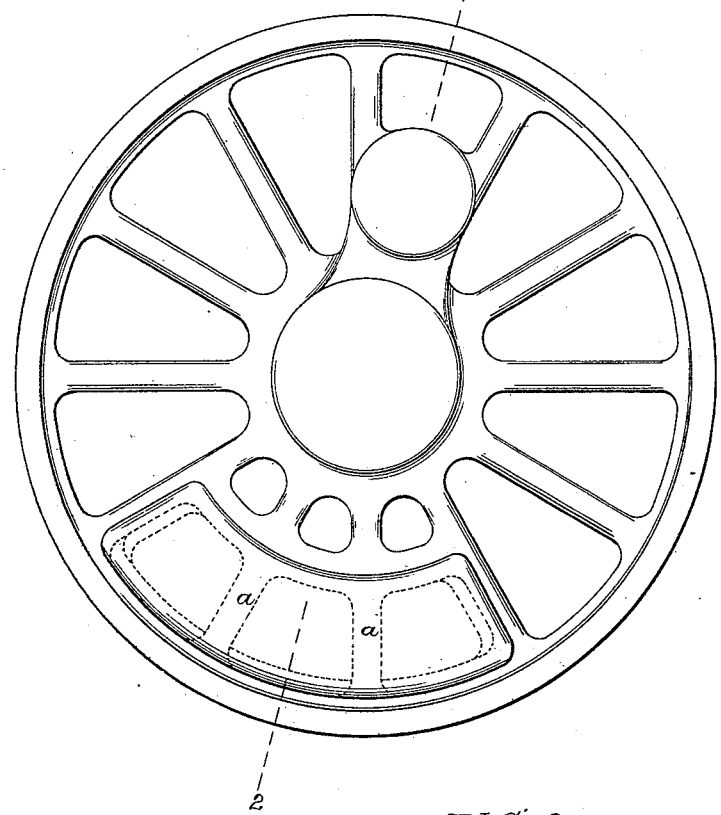
Figure 2:
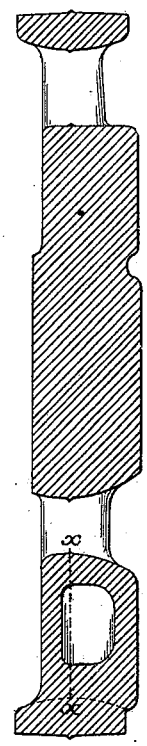
Figure 3:
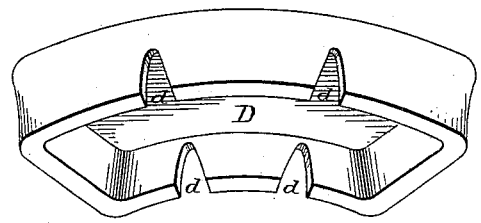
Figure 4:
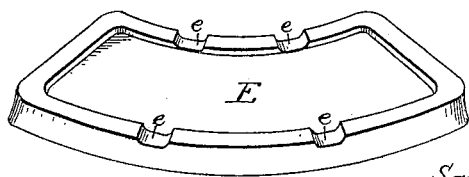

Figure 1 is a view of a counterbalanced wrought-iron driving-wheel center. Fig. 2 is a section on the line 1 2, Fig. 1. Fig. 3 is a perspective view of the upper half of the counter-balance section, and Fig. 4 is a perspective view of the lower half of the counter-balance section before welding.

Driving-wheels are made in either of two ways—the one complete, with tire and center or body in a single piece, and the other made of two parts, the center and the tire, the latter being subsequently shrunk upon the center. The illustration in the drawings represent a driving-wheel center, the tire being omitted, although my invention may be adopted in the manufacture of complete wheels—that is to say, wheels having the tires forged with the center or body.

I prefer to make the driving-wheel center by the process set forth in my patent, No. 408,056, dated July 30, 1889—that is, the material from which the wheel is made is first bent to form a portion of the rim and spoke sections, the ends of which are inserted into hub-sections, the whole being bound by a rim-section, as fully set forth in said patent. When these sections are put together, the sections D and E, (shown in Figs. 3 and 4,) which form the counter-balance, are placed in position on the wheel after it is made up. The openings $d$ in the sections D allow the portion D to pass over the spokes $a\ a$, while the openings $e$ in the portion E allow the portion E to pass over the spokes. The sections are clamped to the wheel in any suitable manner and by any means commonly used in the art of welding. The wheel is then placed in the furnace, and when welding heat is reached is placed between suitable dies, which weld the sections of the wheel into one solid structure, the counter-balance section welding on the line $x\ x$, Fig. 2.

By having a hollow counter-balance, as described, the strain that ensues when the forging of a wrought-iron wheel-center with a solid counter-balance is undertaken is avoided. The metal being non-compressible in solid counter-balances prevents the dies from coming together at that point, and it often happens that a misshapen wheel is the result, and the spokes adjacent to the counter-balance are often distorted; but by having a hollow counter-balance, as set forth, the metal is compressible, yielding to a certain extent, allowing the dies to come together and form a perfect wheel.

In some instances the wheel may be forged complete without the counter-balance.

The counter-balance sections may be placed in position after the forging of the body or center and that portion of the wheel reforged until the whole merges, forming a solid unitary structure.

An opening may be formed in the counter-balance portion of the wheel to allow lead or other metal to be poured into the recess formed by the sections D and E to balance the wheel when finished.

I claim as my invention—

1. A solid forged wrought-iron driving-wheel or center having a hollow counter-balance, substantially as specified.

2. The combination of the hub, spoke, and rim sections of a wrought driving-wheel or center with dished-out counter-balance sections D and E, applied to opposite sides of the wheel or center between the hub and rim, substantially as specified.

3. The combination of the hub, spoke, and rim sections of the driving-wheel or center with dished-out counter-balance sections D and E, said sections having openings $d$ and $e$, to allow the sections to pass over one or more of the spokes of the wheel, substantially as specified.

In testimony whereof I have signed my name to this specification in the presence of two subscribing witnesses.

SAMUEL M. VAUCLAIN.

Witnesses:
HENRY M. WORRALL,
CHAS. E. WOLLÉ.